United States Patent Office 3,028,510
Patented Apr. 3, 1962

3,028,510
DIODE GATE UTILIZING CHARGED CAPACITOR TO FORWARD BIAS DIODE
Joseph M. Bernstein, Bensenville, Ill., assignor to Automatic Electric Laboratories, Inc., a corporation of Delaware
Filed Dec. 21, 1959, Ser. No. 860,907
3 Claims. (Cl. 307—88.5)

This invention relates to circuit controlling arrangements and more particularly to such arrangements in which switching is accomplished by only static elements.

In a variety of electrical circuits, for example in telephone switching systems, there is need for an arrangement including a control element which can be actuated readily and efficiently to change a path in the circuit or system from a high-impedance to a low-impedance condition and which, further will be bidirectional in transmission properties and introduce no appreciable transmission loss. Static switching devices of this nature are known, but they are very expensive, or require a large amount of control power, or suffer from other disadvantages.

It is a principal object of this invention to provide a switching arrangement which is simple, effective, inexpensive, and which requires a very low amount of control power.

According to the invention, a circuit controlling arrangement is provided which comprises a diode and a bias capacitor connected in series in the circuit to be controlled, with a connection to a direct-current source to bias the diode in the reverse direction and thus present a high impedance to the circuit; and for switching to the low-impedance state pulses are supplied through a circuit which includes a transformer core to supply energy to the capacitor and cause it to acquire a direct-current charge which biases the diode in the forward direction, thus providing a low-impedance path for alternating current signals in the principal circuit path.

Further, according to one embodiment of the invention, the charging control circuit includes an auxiliary capacitor and two transformers. To switch the diode from the high-impedance to the low-impedance state, one of the transformers supplies a pulse from its output winding of sufficient energy to charge the auxiliary capacitor, which is connected to the bias capacitor and to the diode to immediately bias the diode into forward conduction. A train of low energy pulses is then supplied from a winding of the other transformer through a rectifying device to maintain the charge on the auxiliary capacitor. To switch from the low-impedance to the high-impedance state the first transformer supplies pulses of opposite polarity so that it discharges the auxiliary capacitor, and at the same time the supply of pulses from the second transformer is cut off.

Figure 1:
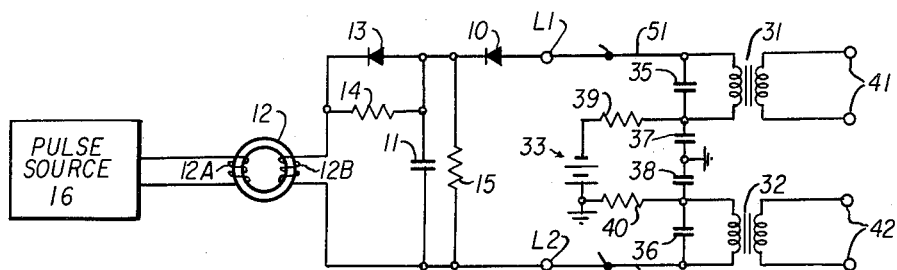
Figure 2:
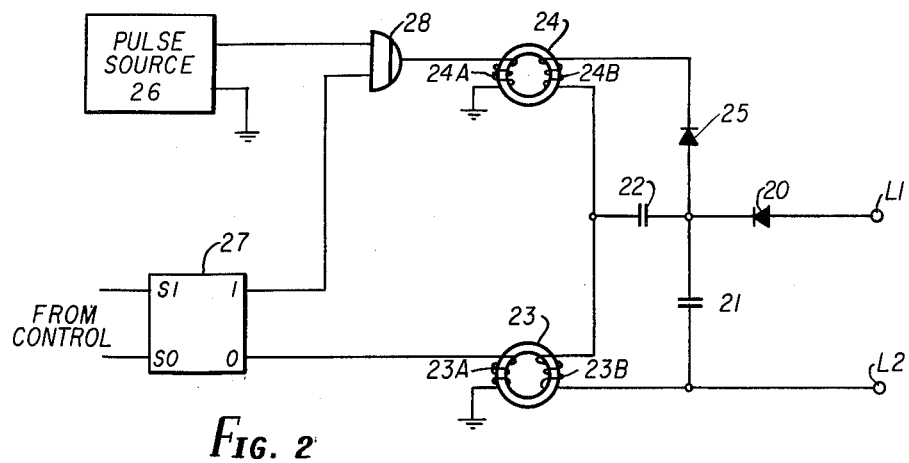

The above-mentioned and other objects and features of this invention and the manner of attaining them will become more apparent, and the invention itself will be best understood, by reference to the following description of embodiments of the invention taken in conjunction with the accompanying drawings comprising FIGURES 1 and 2, which are schematic diagrams of respective embodiments of a circuit controlling arrangement in accordance with the invention.

Referring to FIGURE 1, the circuit controlling arrangement includes a diode 10 and a capacitor 11 connected between terminals L1 and L2 in series with the circuit to be controlled. For coupling to the controlled circuit, transformers 31 and 32 may have their secondary windings connected in series between the terminals L1 and L2. One circuit such as a telephone circuit may then be connected to the terminals 41 across the primary winding of transformer 31, and another telephone circuit may be connected to terminals 42 across the primary winding of transformer 32. The secondary windings of the transformers 31 and 32 are shunted respectively by capacitors 35 and 36 to bypass any high frequency components which may be introduced by the switching circuit. A direct-current source may be connected into the circuit in any convenient manner to bias the diode 10 in a reverse direction. For example a battery 33 in series with resistors 39 and 40 and by-passed by condensers 37 and 38 may be connected between the secondary windings of the transformers 31 and 32. Either pole of the battery may be grounded, and the junction of capacitors 37 and 38 is grounded for the alternating-current circuit.

In the circuit controlling arrangement the bias capacitor 11, which is normally in a discharged condition, is shunted by a resistor 15. The direct current from battery 33 flows through resistors 39 and 40, the secondary windings of transformers 31 and 32, resistor 15 and diode 10; thereby biasing diode 10 in a reverse direction so that it presents a high impedance for alternating-current potentials which may appear across the transformers 31 or 32.

To switch the circuit controlling arrangement so that it presents a low impedance between the terminals L1 and L2, a pulse source 16 is activated to supply pulses to the winding 12A of transformer 12. A winding 12B on the transformer 12 is connected in series with a charging diode 13 and the bias capacitor 11. Winding 12B is so connected that the pulses applied to winding 12A cause a potential to be induced in winding 12B such that current flows through the diode 13 to charge the capacitor 11 so that its upper plate becomes negative. The diode 10 then becomes biased in the forward direction, so that the arrangement then presents a low impedance to alternating current potentials applied to the terminals L1 and L2 from the transformers 31 and 32. Capacitors 35 and 36 act to filter out the high frequency components introduced by the control pulses from winding 12B. To provide for distortion free transmission between the circuits connected to the terminals 41 and 42, the direct current flow through diode 10 which is produced by the charge across capacitor 11 is made to have an amplitude greater than the peak alternating current amplitude in the secondary circuits of the transformers 31 and 32.

To switch from the low-impedance to the high-impedance state, the pulses from source 16 are stopped, or they may be reversed in polarity. The capacitor 11 then discharges through resistor 15 and other paths in the circuit, so that diode 10 again becomes reverse biased by current flow from battery 33.

For use in systems such as telephone switching, several such circuit controlling arrangements may be connected in a coordinate matrix. Several conductors such as conductor 51, each terminated by a transformer such as transformer 31, may for example be used as horizontal conductors; and several conductors such as conductor 52, each terminated by a transformer such as transformer 32, may be used as vertical conductors. Then at each crosspoint a circuit controlling arrangement will have a terminal L1 connected to the horizontal conductor and a terminal L2 connected to the vertical conductor.

An alternative embodiment, shown in FIGURE 2, provides faster switching, and requires only a small control power for maintaining the bias charge during the low-impedance state of the circuit controlling arrangement. A diode 20 and a bias capacitor 22 are connected in series with the secondary winding 23B of a second transformer 23 between the terminals L1 and L2. A relatively large capacitor 21 is shunted from the junction point of diode 20 and capacitor 22 to terminal L2, to provide a low-impedance path for voice-frequency signals. The capacitor 22 is relatively small, so that it has a high impedance compared to capacitor 21. A controlled circuit similar to that shown in FIGURE 1, or horizontal and vertical conductors of a coordinate matrix, may be connected between the terminals L1 and L2. Direct-current bias from a source similar to battery 33 then supplies current which flows through diode 20 in the reverse direction to bias it to a high-impedance state for alternating current signals.

To switch the circuit controlling arrangement from the high-impedance to the low-impedance state, the transformer 23, induces a positive pulse in the winding 23B which charges the capacitors 21 and 22 in series. The winding 23B is so poled that capacitor 22 is charged with a negative polarity on its right hand plate, thereby biasing diode 20 in the forward direction. Since capacitor 22 is relatively small compared to capacitor 21, the greater part of the output potential from the winding 23B pulse is applied across capacitor 22. However the impedance of capacitor 21 is much less so that the signal applied to terminals L1 and L2 will pass thru diode 20 and capacitor 21. The design of transformer 23 and the value of the input pulse to winding 23A are such that in a single short positive output pulse from winding 23B enough power is obtained to charge capacitor 22 to the desired value to forward bias the diode 20. Thus very rapid switching of the circuit is obtained. To maintain the bias charge, a train of pulses is supplied through transformer 24 and rectified by diode 25 to supply charging current to capacitor 22. This corresponds to the arrangement in FIG. 1 wherein a train of pulses through transformer 12 and rectified by diode 13 supplies the charging current to capacitor 11. In each case only a very small amount of power is drawn from the respective pulse source 16 or 26 after the initial switching interval. The output from winding 24B will not be shunted by the path through capacitor 21 and winding 23B, because winding 23B has a high impedance to the pulse current.

To switch the circuit controlling arrangement from the low-impedance to the high-impedance state, the transformer 23 induces a negative pulse in the output winding 23B which discharges the capacitor 22. The diode 20 is then again reverse biased, so that there is a high impedance between terminals L1 and L2 for alternating current signals. The supply of pulses to winding 24A is also cut off.

The input signals to transformers 23 and 24 may be controlled by a flip-flop 27 and an AND gate 28. To switch the circuit controlling arrangement to provide a low impedance between the terminals L1 and L2, an input signal is supplied to the terminal S1 of the flip-flop to cause it to switch to its state 1. The change of potential at the 0 output is coupled to the winding 23A to produce the input pulses to the transformer 23. The output potential from terminal 1 of the flip-flop 27 is supplied as an input to gate 28 to enable it so that it will pass pulses from the pulse source 26. The output from gate 28 is connected to winding 24A to supply the input pulses to the transformer 24.

To switch back to the high-impedance state, an input signal is applied to the terminal S0 of flip-flop 27. The change of potential at the 0 output then applied to winding 23A supplies the input pulse to transformer 23 which causes a negative output pulse to be produced at winding 23B to discharge capacitor 22 and return the circuit to the high-impedance state. Gate 28 becomes blocked because the enabling potential is removed from the output 1 of the flip-flop 27; and therefore the supply of pulses to winding 24A is terminated.

In FIG. 2, it is possible to replace the AND gate 28 and core 24 by a transfluxer.

In a specific design of the embodiment shown in FIGURE 1, the capacitor 11 has a value of 1 microfarad, resistor 15 has a value of 8200 ohms, diode 13 is shunted by a 100,000 ohm resistor 14, and the secondary windings of the transformers 31 and 32 are shunted by capacitors 35 and 36 respectively, each having a value of 0.2 microfarad. The battery 33 is bypassed by a capacitor 37 having a value of 100 microfarads. The magnetic core of transformer 12 is type 180T5 (International Telemeter Corporation) having 15 turns in winding 12A and 25 turns in winding 12B. The pulses supplied to 12A have a repetition rate of 100 kilocycles, and a pulse width of 1.5 microseconds.

While I have described above the principles of my invention in connection with specific apparatus it is to be clearly understood that this description is made only by way of example and not as a limitation to the scope of my invention.

What is claimed is:

1. A circuit controlling arrangement comprising a pair of terminals, a unidirectional device and a bias capacitor connected in series between said terminals, a connection to a direct-current source for biasing said device in a reverse direction, a transformer, a primary winding on said transformer coupled to a pulse source; a secondary winding on said transformer coupled through a rectifying device to said capacitor so that, responsive to pulses applied to the primary winding, current from the secondary winding charges the capacitor to a direct-current potential which biases said first device in a forward direction; wherein said unidirectional device is connected between one of said terminals and a junction point, and said arrangement further includes a second capacitor having a large value of capacitance compared to the first said capacitor connected from said junction point to the other of said terminals, a second transformer having an input and an output winding, means coupling the output winding of the second transformer in series with said first capacitor, means for introducing a pulse to the primary winding of said second transformer to induce a pulse in its output winding of a polarity which charges said capacitors so that a direct-current potential is obtained at said junction point which biases said unidirectional device in a forward direction, the bias change being maintained by pulses supplied through the first said transformer and said rectifying device, thereby providing a low-impedance path for alternating currents between the terminals through said unidirectional device and said second capacitor.

2. A circuit controlling arrangement according to claim 1, further including means for producing an input pulse of opposite polarity to said second transformer to thereby induce current flow in its output which discharges said capacitors, and means for blocking the supply of pulses to the input winding of said first transformer, so that said unidirectional device becomes reverse biased by said direct-current source and presents a high-impedance to alternating current signals coupled to said terminals.

3. A circuit controlling arrangement according to claim 2, further including a bistable device having a first state corresponding to the high-impedance and a second state corresponding to the low-impedance condition at said terminals; a coincidence gate circuit connected with its output to said input winding of the first transformer, one input to the pulse source, and one input to an output of said bistable device; the connections being such that during intervals in which the bistable device is in its first state the coincidence gate blocks pulses from the pulse source, and during intervals in which the bistable device is in its second state the coincidence gate passes pulses to the input winding of the first transformer; and a connection from an output of the bistable device to the input winding of the second transformer, and means responsive to switching of the bistable device between said states for supplying the input pulses to the second transformer.

References Cited in the file of this patent

UNITED STATES PATENTS

| | | |
|---|---|---|
| 2,443,195 | Pensyl | June 15, 1948 |
| 2,773,982 | Trousdale | Dec. 11, 1956 |
| 2,802,954 | Graham et al. | Aug. 13, 1957 |
| 2,847,159 | Curtis | Aug. 12, 1958 |
| 2,892,037 | Feenir | June 23, 1959 |
| 2,892,975 | Eilers | June 30, 1959 |
| 2,904,705 | Elliott | Sept. 15, 1959 |
| 2,908,830 | Mason et al. | Oct. 13, 1959 |